INVENTOR
R. A. WYDRO, SR.
BY E. C. Pearson
ATTORNEY

April 30, 1968 R. A. WYDRO, SR 3,380,136

METHOD OF MAKING CAPACITORS

Filed June 19, 1965 2 Sheets-Sheet 2

United States Patent Office 3,380,136

Patented Apr. 30, 1968

3,380,136

METHOD OF MAKING CAPACITORS

Richard A. Wydro, Sr., Trenton, N.J., assignor to Western Electric Company, Incorporated, New York, N.Y., a corporation of New York Filed July 19, 1965, Ser. No. 472,889
7 Claims. (Cl. 29—25.42)

ABSTRACT OF THE DISCLOSURE

A dielectric tape is provided with a first metallic coating on one side thereof which first coating runs generally parallel with the length of the tape and with a second metallic coating on the other side of the tape which second coating runs generally parallel with the length of the tape but which does not overlap the first coating. The dielectric tape is folded along a first longitudinal line to bring the first and second coatings into an overlapping relationship and the tape is severed along a second line which is parallel to the first line and which runs between the metallic coatings. This permits a capacitor to be wound from a single tape supply.

This invention relates to a method of making a capacitor. In particular it relates to a method of coating and winding metallized capacitor dielectrics.

In the manufacture of metallized capacitors several processes are presently used. One method involves metallizing the entire side of a tape of delectric material to produce what is called a "simplex tape," and then interleaving two such simplex tapes to form a capacitor. This requires winding the capacitor from two spools of tape with the associated problems of coordinating two tensioning devices and keeping an adequate supply of tape on each spool. Another method involves metallizing both sides of a tape of dielectric material to produce what is called a "duplex tape," and then interleaving a duplex tape and a tape of dielectric material to form a capacitor. Again this involves the inherent disadvantages of using two spools. Furthermore, it is not possible to wind the capacitor to value with the duplex tape, since the counter electrodes on the supply spool are in contact with each other.

Therefore, it is an object of this invention to provide a new and improved method of making capacitors.

Another object of the invention is to provide a method for winding metallized capacitors from one supply spool.

It is a further object of the invention to provide a method which permits winding metallized capacitors to value from one supply spool.

With these and other objects in mind, the invention contemplates forming a capacitor from a single tape of dielectric material. This tape has a first metallized coating on one side which extends only partially across the width of the tape and a second metallized coating on the other side of the dielectric strip, extending only partially across the width of the strip. The second coating should not overlap the first coating. The metallized tape is folded along a first longitudinal line and is cut along a second longitudinal line which is parallel to but displaced from the first longitudinal line resulting in two strips having overlapping metallized areas. The two overlapping metallized strips may then be spirally wound to form a capacitor body.

Other objects and advantages of the present invention will be apparent from the following detailed description when considered in conjunction with the accompanying drawings wherein.

Figure 8:
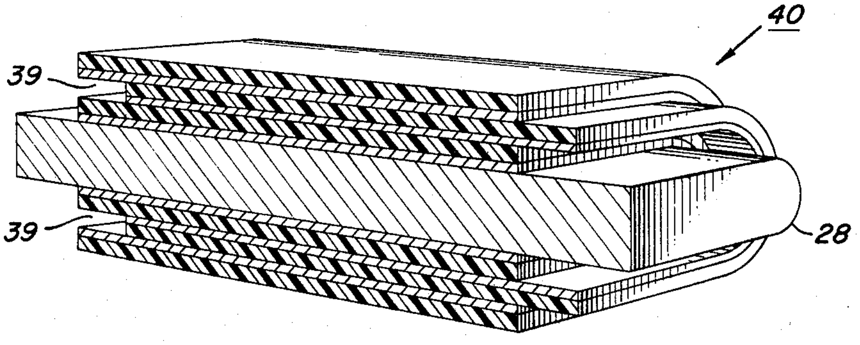
Figures 4, 5, 6, 7:
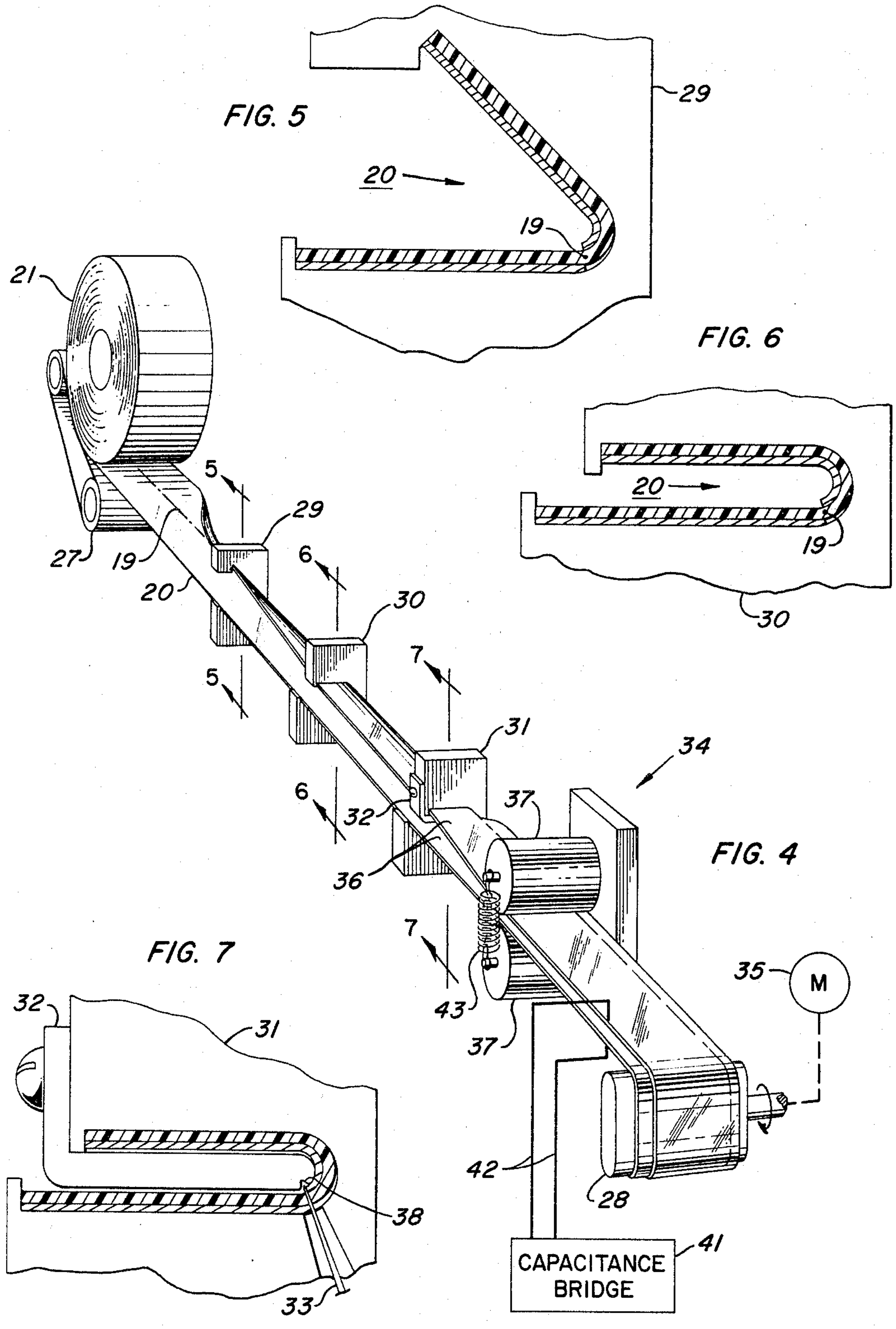
FIGURE 4 is an overall schematic view of an apparatus for producing a capacitor from a tape similar to that illustrated in FIGURE 3 in accordance with the method of the invention.

FIGURES 5 and 6 are cross sections of the forming dies used for folding the metallized tape taken generally along the lines 5—5 and 6—6, respectively, in FIGURE 4;

FIGURE 7 is a cross section of the final forming die with a knife assembly attached thereto taken generally along the line 7—7 in FIGURE 4; and FIGURE 8 shows a cross section of several windings of a capacitor made according to the method of this invention.

Figure 1:
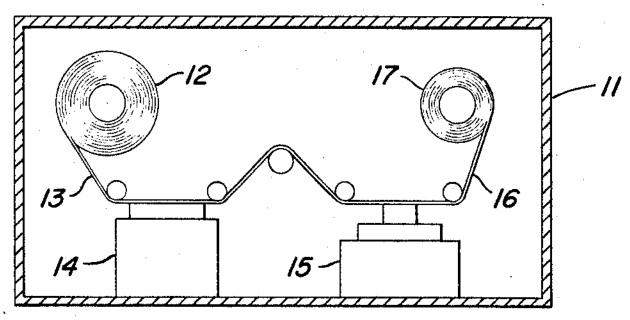
FIGURE 1 is a vertical section of a vacuum deposition chamber suitable for metallizing a dielectric tape.

Referring now in detail to the drawings and particularly FIGURE 1, there is illustrated a vertical section of a vacuum deposition chamber 11. A supply roll 12 of a dielectric tape 13 suitable for a capacitor, such as Mylar, is mounted within the vacuum chamber 11. The dielectric tape 13 passes over a seeding applicator 14 and a metallizing applicator 15. The seeding applicator 14 applies a vaporized seeding metal to the dielectric tape 13 through a mask which determines the area of the dielectric tape 13 which is coated with the seeding metal. The seeding metal is used to provide an adequate bond between the final metallized coating, as applied by the metallizing applicator 15 and the dielectric tape 13. This method of applying the metallized coating is well known in the art and is described in more detail in U.S. Patent 2,702,760 issued to E. I. Barth on Feb. 22, 1955.

Figure 2:
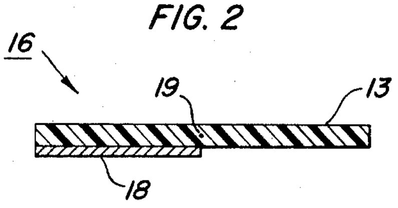
FIGURE 2 is a cross section of a dielectric tape metallized on one-half of one side.
Figure 3:
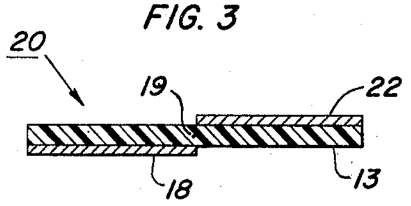
FIGURE 3 is a cross section of a dielectric tape which has been metallized on the opposite halves of opposite sides of the dielectric.

The partially metallized tape 16 is then advanced to a take-up roll 17. The cross section of the partially metallized tape 16 is shown in FIGURE 2 wherein the dielectric tape 13 is coated on one side and the metallized coating 18 extends from one longitudinal edge of the dielectric tape 13 to the longitudinal axis 19 of the dielectric tape 13. The take-up roll 17 is then placed in a second vacuum deposition chamber, which may be a duplicate of vacuum chamber 11, wherein the uncoated or opposite side of the dielectric tape 13 is coated with a metallic coating 22 which extends from the opposite longitudinal edge of the dielectric tape 13 to the longitudinal axis 19. As shown in FIGURE 3, the metallic coatings 18 and 22 do not overlap.

The successful practice of this invention is not dependent upon the above-described technique for producing the structure illustrated in FIGURE 3. Other suitable coating techniques will occur to those skilled in the art.

As seen in FIGURE 4, the metallized tape 20 is mounted on a supply spool 21 which is controlled by a tensioning device 27, which may be one of many such devices well known in the art. Tape 20 is threaded through a series of forming dies 29, 30, and final forming die 31, through pressing assembly 34 and attached to winding mandrel 28. The mandrel is coupled by means of a shaft to a source of rotative power, for example, an electric motor 35. As is apparent, when the motor 35 is turned on, the mandrel 28 rotates and the tape is wound about the mandrel 28. The way in which the tape 20 is handled between the supply spool 21 and the mandrel 28 is of particular importance.

The metallized tape 20 passes through a first forming die 29 causing a fold at about a 45° angle as shown in FIGURE 5. The tape 20 then passes through a second forming die 30 which folds the tape 20 into a U-shaped formation as shown in FIGURE 6. It should be noted that the fold in the tape 20 is along a longitudinal line which is displaced from but parallel to the longitudinal axis 19. The metallized tape 20 then passes into a final forming die 31 which holds the fold obtained by the second forming die 30. As shown in FIGURE 7, a Teflon insert 32 and a knife blade 33 are mounted at the exit end of the final forming die 31. The Teflon insert 32 has a groove 38 near the point where the metallized tape 20 is folded to receive the knife blade 33. The knife blade 33 must be mounted so that it can easily be retracted out of Teflon insert groove 38 in order to allow for the initial threading of the dies with the metallized tape 20. Then the knife 33 is inserted into the groove 38 causing a puncture in the metallized tape 20. As the rotating mandrel 28 advances the metallized tape 20, it will be continuously slit by the knife 33. The split metallized tape 20 leaves the final forming die 31 in two strips 36—36 (FIGURE 4). Since the folding and slitting occurs along two different longitudinal lines one strip will be transversely offset from the other. An equally good alternative to the use of dies 29, 30, and 31 would be one die with a continuously changing cross section.

After the offset strips 36—36 leave the final forming die 31 they pass through a pressing assembly 34 which comprises two rollers 37—37 held in close relationship to each other by a spring 43. This pressing assembly 34 holds the two strips 36—36 in contact and in proper transverse offset alignment with each other prior to the actual winding. The two strips 36—36 are then wound about a mandrel 28 to the required number of turns to obtain a desired capacitance. The two strips 36—36 are then severed and the capacitor is removed from the mandrel to be terminated.

As stated earlier, the practice of this invention allows one to wind a capacitor to value using only one supply spool. In order to do this a well-known bridge 41, such as the General Radio Capacitance Type 1650A, is connected by leads 42 and 43 to the two metallized strips 36—36 prior to the winding operation. When the bridge 41 is balanced, depending upon the desired value of capacitance, the motor 35 is stopped.

FIGURE 8 illustrates several turns of a capacitor on a mandrel. The reason for the offset relationship between the two metallized strips 36—36 is to provide adequate spaces 39 for a terminating material to enter the ends of the capacitor and make contact with a significant area of the metallized coating. One possible way of making such a termination is by injecting molten solder into the spaces 39. Such a technique is described in copending application, Ser. No. 267,471, filed Mar. 25, 1963, by R. H. Cushman and J. A. Hosford, assignors to the Western Electric Company, Incorporated. It should be noted that the metallic coating 18 and 22 need not extend to the longitudinal axis 19, as shown in FIGURE 3, as long as the folding and slitting occur at two displaced longitudinal lines so that the two strips 36—36 leaving the final forming die 31 have metallized coatings transversely offset from one another and the metallized coatings have overlapping areas.

While one specific embodiment of practicing the invention has been described in detail above, it will be obvious that various modifications may be made from the specific details without departing from the spirit and scope of the invention.

What is claimed is:

1. A method for forming a capacitor from a dielectric tape wherein the tape has a first metallic coating on one side of the tape which runs longitudinally along the length of the tape and a second metallic coating on the other side of the tape which also runs longitudinally along the length of the tape, there being no overlap between the metallic coatings, the method comprising the steps of:

folding the tape along a first longitudinal line to bring the first metallic coating into an overlapping relationship with the second metallic coating, and severing the tape along a second line which is parallel to the first longitudinal line and which lies between the metallic coatings to produce two strips having overlapping metallic coatings.

2. A method according to claim 1 comprising the additional step of winding the two strips to form a capacitor.

3. In a method for forming a capacitor from a dielectric tape having a metallic coating on opposite halves of opposite sides with no overlap between the coatings, the steps of:

folding the metallized tape along a longitudinal line displaced from the longitudinal axis of the tape to bring the metallic coatings into an overlapping relationship, severing the metallized tape along its longitudinal axis to produce two strips having overlapping metallic coatings, and winding the two strips to form a capacitor.

4. A method for forming a capacitor which comprises the steps of:

applying a first metallic coating to one side of a dielectric tape, extending partially across the tape width;

applying a second metallic coating to the second side of the dielectric tape, extending partially across the tape width but not overlapping the first metallic coating;

folding the metallized tape along a first longitudinal line to bring the metallic coatings into an overlapping relationship; and severing the metallized tape along a second longitudinal line which is parallel to the first line and between the metallic coatings to produce two strips having overlapping metallic coatings.

5. A method for forming a capacitor which comprises the steps of:

applying a first metallic coating to one side of a dielectric tape, extending partially across the tape width;

applying a second metallic coating to the second side of the dielectric tape, extending partially across the tape width but not overlapping with the first metallic coating;

folding the metallized tape along a first longitudinal line to bring the metallic coatings into an overlapping relationship;

severing the metallized tape into two strips along a second longitudinal line between the two coatings but parallel to and displaced from the first longitudinal line to produce two strips having overlapping metallic coatings; and winding the two strips to form a capacitor.

6. A method for forming a metallized capacitor which comprises the steps of:

applying a first metallic coating to one side of a dielectric tape having two parallel longitudinal edges, the coating extending from one edge of the tape to the longitudinal axis of the tape;

applying a second metallic coating to the second side of the dielectric tape, the coating extending from the second edge of the tape to the longitudinal axis of the tape;

folding the metallized tape along a longitudinal line displaced from the longitudinal axis a predetermined distance to bring the metallic coatings into an overlapping relationship;

severing the metallized tape along its longitudinal axis to form two strips having overlapping metallic coatings; and winding the two strips to form a capacitor.

7. A method according to claim 6 wherein the capacitance of the two metallic strips being wound is continuously measured and the winding is stopped when the capacitance reaches a predetermined value.

References Cited

UNITED STATES PATENTS 3,276,932 10/1966 Gaenge ---------- 317—260 X

FOREIGN PATENTS 838,633 5/1952 Germany.

WILLIAM I. BROOKS, *Primary Examiner.*